Dec. 29, 1931.  F. J. VAN SICKEL  1,838,891
AUTOMOBILE LOCK
Filed Jan. 2, 1931
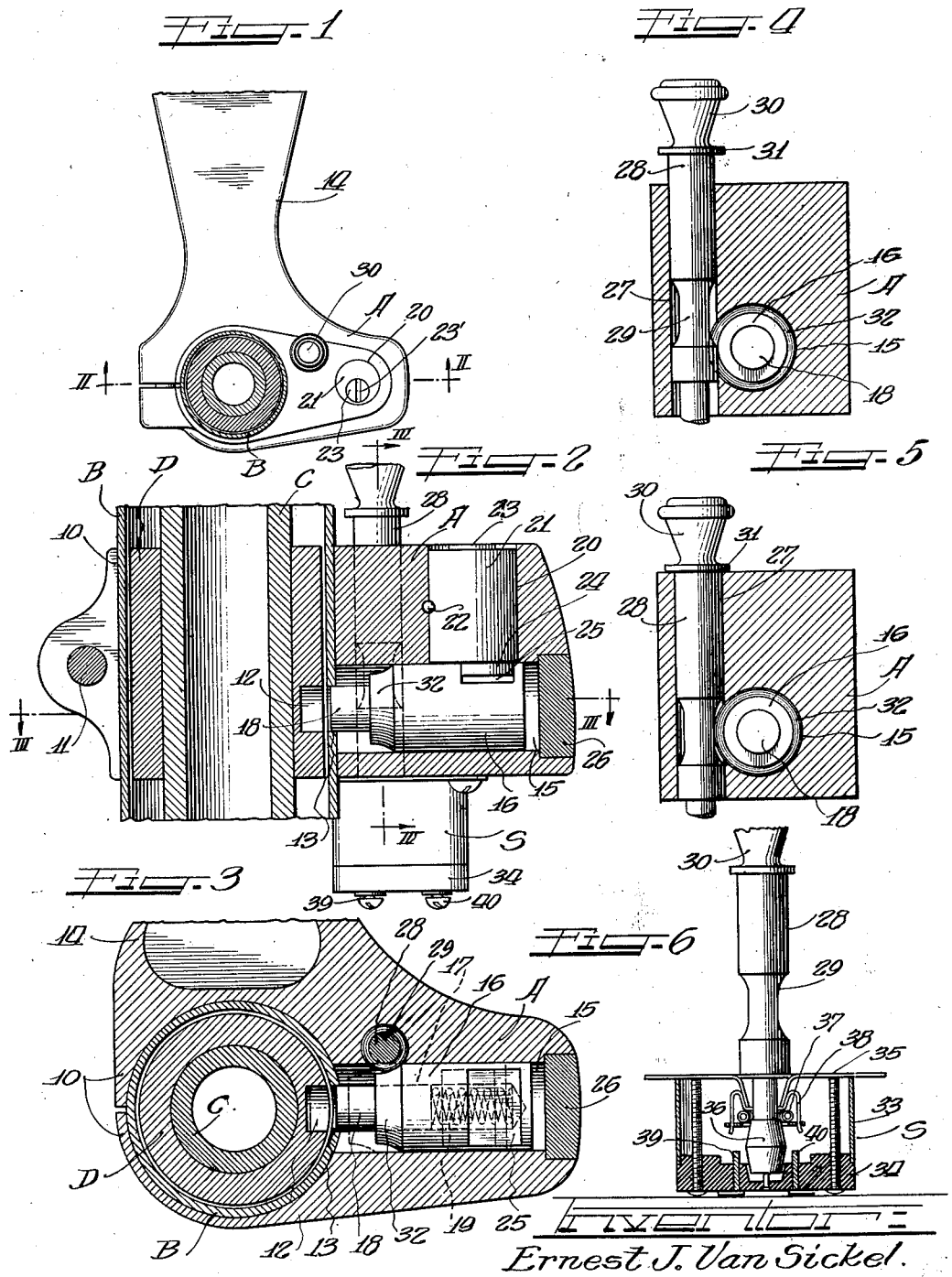
Inventor
Ernest J. Van Sickel.

Patented Dec. 29, 1931

1,838,891

UNITED STATES PATENT OFFICE

ERNEST J. VAN SICKEL, OF WAUKEGAN, ILLINOIS

AUTOMOBILE LOCK

Application filed January 2, 1931. Serial No. 506,017.

This invention relates to automobile locks and particularly to a lock structure for locking the steering means of an automobile and the ignition.

One object of the invention is to provide an axially reciprocable locking bolt for locking engagement with the steering post of an automobile, and an axially shiftable switch rod for actuating the switch mechanism for controlling the ignition circuit of the automobile.

A further object of the invention is to provide improved interlocking engagement between the bolt and the switch rod which will compel a sequential operation of these members, that is, which will compel one of the members to be moved to a predetermined position before the other members can be actuated.

A further object of the invention is to provide for such interengagement between the locking bolt and the switch rod that the locking bolt can be axially reciprocated to locking or unlocking position only when the switch rod is in switch-opening position, and that when the locking bolt is in locking position the switch rod will be locked in switch-opening position, but when the locking bolt is in unlocking position the switch rod will be free for axial shift to close or reopen the switch for corresponding control of the ignition circuit.

The above enumerated and other features of my invention are incorporated in the structure shown on the drawings, in which drawings:

Figure 1 is a plan view of the lock structure with the steering column, to which the lock structure is applied, in transverse section;

Figure 2 is an enlarged section on the plane II—II of Figure 1;

Figure 3 is a section on plane III—III of Figure 2;

Figure 4 is a section on plane IV—IV of Figure 3, showing the switch rod in switch-closing position and in position to lock the steering post locking bolt in unlocking position;

Figure 5 is a section similar to Figure 4 showing the switch rod in switch-opening position and the locking bolt released for reciprocation; and Figure 6 is an elevation of the switch rod with the switch structure controlled thereby in vertical section.

The various locking parts are contained within a housing A provided with a split collar 10 adapted to surround the steering column B. By means of a bolt 11 the split collar is clamped securely to the steering column. Extending through the steering column is the usual steering post C for connecting the steering wheel with the swiveled running wheels at the front of a vehicle. The steering post has secured thereto a bushing D having the groove or socket 12 which may be brought into register with a corresponding opening 13 in the steering column when the steering post is turned by the steering wheel. Extending laterally from the housing A is an arm 14 forming a bracket for connection with the dash or instrument board or other part of the vehicle, whereby to support the steering column in place.

Extending transversely through the housing is a cylindrical lock chamber 15 for the lock bolt structure which comprises a cylindrical plunger 16 reciprocable in the chamber 15 and having a bore 17 for the locking bolt or bar 18, a spring 19 within the plunger tending to force said lock bolt outwardly in the protracted position shown in Figures 2 and 3.

Extending through the housing A at right angles with and communicating with the chamber 15 is the lock pocket 20 for receiving a lock frame 21 which is secured within the pocket as by means of a pin or key 22. The lock barrel 23 has the keyhole 23' for the insertion of a key whereby the barrel may be turned, and to the inner end of the barrel is eccentrically secured the cam 24 which engages in the transverse slot 25 cut in the plunger 16, so that when the barrel is turned by the key the lock bolt structure may be reciprocated axially in the chamber 15. The outer end of the chamber 15 is sealed by a plug 26.

When the lock barrel is turned in one direction the lock bolt structure will be shifted outwardly from its inner position shown in Figure 2 and if during such outward movement the socket 12 on the steering post is in alignment with the passage 13 through the steering column then the locking bolt 18 will be projected into the socket to thus lock the steering post against rotation. If the steering post is in a position so that the socket 12 is displaced from the passage 13 then the locking bolt will be held against the outer face of the bushing D until the steering wheel is turned to a position in which the socket will register so that the locking bolt can then be projected thereinto by the spring 19 to lock the steering post against further rotation.

Extending through the housing A parallel with the lock pocket 20 and at right angles with the axis of the locking bolt chamber 15 is the cylindrical passageway 27 for a switch rod 28. This passage 27 partially intersects the chamber 15 as clearly shown in Figures 4 and 5 and the rod 28 has a circumferential groove 29 which is longitudinally concave to fit the cylindrical surface of the plunger 16 and the locking bolt structure as shown in Figure 5. The rod at its outer end is provided with a head or button 30 by means of which it may be readily reciprocated, and a flange 31 at the base of the head may serve as a stop to limit the inward movement of the rod, the rod when in its inner position holding its circumferential groove 29 in position to receive the locking bolt plunger 16.

The outer end of the plunger 16 is beveled as indicated at 32, this beveled end being longitudinally concave to better fit the cylindrical surface of the switch rod 28 as indicated in Figures 3 and 4. When the locking plunger 16 is at its inner position and the switch rod is pulled out, the unbroken cylindrical end of the rod below the circumferential groove 29 will be in register with the beveled end 32 of the plunger and the plunger will then be locked by the rod against outward movement, being then held in unlocking position.

Referring to Figures 2 and 6, a switch structure F is secured to the underside of the housing A to receive the lower end of the switch rod. The switch structure may be of any suitable type. The structure shown is substantially that disclosed in Patent No. 1,306,852 issued June 17, 1919 to C. J. Klein. Briefly, the switch structure shown comprises an enclosing shell 33 and a terminal block 34 of insulating material secured to the housing A, the base plate 35 having an opening through which the lower end of the switch rod 28 extends, the rod terminating in a double frustum cam member or button 36 with which a garter spring 37 cooperates to shift a switch blade frame 38 into or out of electrical engagement with the terminals 39 and 40 connected with an ignition circuit. When the switch rod 28 is pushed in as shown in Figures 5 and 6 the switch frame 38 is in position to disconnect the terminals 39 and 40, and when the switch rod is pulled out the switch frame 38 will be shifted to connect the terminals to close the ignition circuit.

Describing now the operation, Figures 2 and 3 show the relative dispositions of the parts after the lock bolt structure has been retracted to release the steering post and the switch rod has been pulled out to cause actuation of the switch to close the ignition circuit. The vehicle is then free for operation and the switch rod can be freely shifted in or out to open or close the ignition circuit. Referring particularly to Figure 4, when the switch rod is pulled out to cause closure of the ignition circuit, then the lower cylindrical end of the rod is in register with the beveled end 32 of the retracted plunger 16 and this plunger is locked against outward movement and consequently the lock bolt structure cannot be shifted outwardly by operation of the key while the switch rod is out and the ignition circuit is closed. The switch rod must be pushed in to reopen the ignition circuit before the lock bolt structure can be shifted by the key into locking engagement with the steering post. When the switch rod is pushed in as shown in Figure 5 the lock bolt structure is free to be shifted in either direction by means of the key to lock or unlock the steering post. When the lock bolt structure is shifted out to lock the steering post then the cylindrical body of the plunger 16 is within the circumferential groove 29 of the switch rod and the switch rod will then be prevented from being pulled out to cause closure of the ignition circuit.

The interlocking engagement of the lock bolt structure and the switch rod compels a predetermined sequential operation of these elements. To effect locking of the steering post by means of the key-controlled lock, the switch rod must first be shifted in to cause opening of the ignition circuit before the lock bolt structure can be shifted out to effect locking of the steering post, and then the switch rod cannot be pulled out to reclose the ignition circuit until the lock bolt structure has been retracted to release the steering post. When the switch rod is in and the ignition circuit is open then the locking bolt structure is free to be shifted into or out of locking engagement with the steering post, and when the lock bolt structure is in its unlocking position then the switch rod is free for either inward or outward movement.

Although I have shown one practical and efficient embodiment of the features of my invention, changes and modification may be made in construction and arrangement which would fall within the scope of the appended claims.

I claim as follows:

1. In an automobile lock, the combination with the steering post of a lock comprising a body secured adjacent to said post, a lock bolt structure within said body shiftable axially into or out of locking engagement with said post, a switch rod shiftable axially in said body at an angle with said lock bolt structure, a switch controlled by said switch rod, and interengagement means on said lock bolt structure and said switch rod adapted to compel a sequential operation thereof.

2. In an automobile lock, the combination with a steering post of a lock structure comprising a body fixed adjacent to said post, a lock bolt structure shiftable axially within said body into or out of locking engagement with said post, a switch rod shiftable axially in said body at an angle with said lock bolt structure, a switch controlled by said switch rod, said switch rod being free for movement to either switch opening or switch closing position when said lock bolt structure is retracted and said lock bolt structure being free for movement to either locking or unlocking position when said switch rod is in switch opening position, and interengaging means on said lock bolt structure and switch rod operating to prevent switch closing movement of said rod when said locking bolt structure is in steering post locking position and for preventing movement of said locking bolt structure into locking position when said switch rod is in switch closing position.

3. In an automobile lock, the combination with a steering post of a lock structure comprising a body secured adjacent to said steering post, a lock bolt structure shiftable axially in said body into or out of locking engagement with said post, a switch structure, a switch rod for said switch structure manually shiftable in said body at an angle with said lock bolt structure to set said switch for either circuit opening or circuit closing position, means whereby said switch rod in one of its positions forms a stop for preventing shift of said lock bolt structure from unlocking to locking position, and means whereby said lock bolt structure when in its locking position forms a stop against movement of said switch rod to its other position.

4. In an automobile lock, the combination with a steering post of a lock structure comprising a body secured adjacent to said post, said body having a lock chamber at an angle with said post, a lock bolt structure shiftable axially within said chamber into locking or unlocking position relative to said post, a passage in said body at right angles to said chamber and partially intersecting said chamber, a switch rod shiftable axially in said passage, a switch structure on said body controlled by the movement of said switch rod, said switch rod having a transverse groove registering with and permitting shift of said lock bolt structure when said switch rod is in one of its positions of switch control, said lock bolt structure having a beveled corner at its outer end for receiving said switch rod when said rod is shifted to another position of switch control, said lock bolt structure when shifted to locking position while engaging in the groove of said switch rod locking said switch rod in one of its positions, and said switch rod when shifted to the other of its positions while said locking bolt structure is in unlocking position engaging with said beveled corner to hold said lock bolt structure in such unlocking position.

5. A lock for association with a movable member comprising a body adapted to be fixed relative to said movable member, a lock chamber in said body, a lock bolt structure shiftable axially in said chamber into or out of locking engagement with the movable member, a passage through said body at an angle with and at one side of the axis of said chamber and partially intersecting said chamber, a switch supported by said body, a switch rod shiftable axially in said passage to control said switch, said switch rod having a clearance passage through which said lock bolt structure may freely pass for locking or unlocking movement when said switch rod is in one of its positions of switch control and said lock bolt structure when engaging in said clearance passage locking said switch rod in such position, said lock bolt structure having a clearance passage permitting free movement of said switch rod to either of its switch controlling positions when said lock bolt structure is in unlocking position and said switch rod when in the other of its switch controlling positions engaging in said lock bolt structure clearance passage to hold said lock bolt structure in its unlocking position.

In testimony whereof, I have hereunto subscribed my name at North Chicago, county of Lake.

ERNEST J. VAN SICKEL.